US012780439B2

(12) United States Patent
Lefebvre et al.

(10) Patent No.: US 12,780,439 B2
(45) Date of Patent: Nov. 3, 2026

(54) EXHAUST CASE FOR AIRCRAFT ENGINE

(71) Applicant: PRATT & WHITNEY CANADA CORP., Longueuil (CA)

(72) Inventors: Guy Lefebvre, St-Bruno-de-Montarville (CA); Francois Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 3 days.

(21) Appl. No.: 18/987,301

(22) Filed: Dec. 19, 2024

(65) Prior Publication Data

US 2026/0175991 A1 Jun. 25, 2026

(51) Int. Cl.
*B64D 33/04* (2006.01)
*F01D 25/30* (2006.01)

(52) U.S. Cl.
CPC ............. *B64D 33/04* (2013.01); *F01D 25/30* (2013.01)

(58) Field of Classification Search
CPC ................................ B64D 33/04; F01D 25/30
See application file for complete search history.

(56) References Cited

U.S. PATENT DOCUMENTS

| | | | | |
|---|---|---|---|---|
| 3,152,443 | A | 10/1964 | Newland | |
| 4,040,249 | A | 8/1977 | Kahle et al. | |
| 4,177,638 | A | 12/1979 | Wood | |
| 4,765,751 | A | 8/1988 | Pannone et al. | |
| 6,290,173 | B1 | 9/2001 | Nickels | |
| 6,959,552 | B2 * | 11/2005 | Leblanc | F02C 7/055 137/15.1 |
| 8,965,728 | B2 | 2/2015 | Snider et al. | |
| 9,157,334 | B2 | 10/2015 | Grede et al. | |
| 9,880,059 | B2 | 1/2018 | Myers et al. | |
| 9,969,500 | B2 | 5/2018 | Anderson et al. | |
| 10,119,449 | B2 | 11/2018 | Boekeloo et al. | |
| 10,514,003 | B2 | 12/2019 | Akcayoz et al. | |
| 10,550,767 | B2 | 2/2020 | Eleftheriou et al. | |
| 10,697,076 | B2 | 6/2020 | Millward et al. | |

(Continued)

FOREIGN PATENT DOCUMENTS

| | | | |
|---|---|---|---|
| CA | 3084782 | A1 | 3/2021 |
| CA | 3160067 | A1 | 11/2022 |

(Continued)

*Primary Examiner* — Nathaniel E Wiehe
*Assistant Examiner* — Aye S Htay
(74) *Attorney, Agent, or Firm* — NORTON ROSE FULBRIGHT CANADA LLP

(57) ABSTRACT

An exhaust system for an aircraft engine of an aircraft having a direction of travel, has: a turbine exhaust duct (TED) having an annular inlet conduit extending around a central axis for directing combustion gases generally in an axial direction and outlet conduits communicating with the annular inlet conduit and extending generally radially outward relative to the annular inlet conduit; and an exhaust case enclosing the TED, the exhaust case extending from a forward end to a rearward end relative to the direction of travel, the exhaust case having openings, each of the outlet conduits received through a respective one of the openings; and reinforcing members secured to the exhaust cases between the forward end and the rearward end, the reinforcing members being located opposite circumferential sides of the openings and locally increasing a thickness of the exhaust case.

20 Claims, 7 Drawing Sheets

(56) References Cited

U.S. PATENT DOCUMENTS

| | | | | |
|---|---|---|---|---|
| 11,319,897 | B2 | 5/2022 | Young et al. | |
| 11,428,122 | B1 | 8/2022 | Lefebvre et al. | |
| 11,719,165 | B2 | 8/2023 | Le Pape et al. | |
| 11,840,346 | B2 | 12/2023 | Ozóg | |
| 11,905,844 | B2 | 2/2024 | Kim et al. | |
| 11,999,501 | B2 | 6/2024 | Joo et al. | |
| 12,246,844 | B1 | 3/2025 | Weaver et al. | |
| 2009/0126366 | A1 | 5/2009 | Farber | |
| 2014/0047813 | A1 | 2/2014 | Frailich et al. | |
| 2014/0186167 | A1 | 7/2014 | Liles et al. | |
| 2014/0366544 | A1 | 12/2014 | Maccaul et al. | |
| 2015/0143816 | A1 | 5/2015 | Salunkhe et al. | |
| 2016/0177872 | A1* | 6/2016 | Akcayoz | F02K 1/40 239/265.11 |
| 2017/0067369 | A1 | 3/2017 | Hashimoto | |
| 2019/0031362 | A1 | 1/2019 | Petty, Sr. et al. | |
| 2021/0215121 | A1* | 7/2021 | Joo | F02K 1/40 |
| 2022/0205369 | A1* | 6/2022 | Kim | F01D 25/30 |
| 2022/0260001 | A1* | 8/2022 | Lefebvre | F01N 13/008 |
| 2023/0138749 | A1 | 5/2023 | Durocher et al. | |
| 2023/0406525 | A1* | 12/2023 | Joo | F01D 25/30 |
| 2024/0150030 | A1 | 5/2024 | Legras et al. | |
| 2024/0254942 | A1 | 8/2024 | Akcayoz et al. | |

FOREIGN PATENT DOCUMENTS

| | | | |
|---|---|---|---|
| CA | 3180641 | A1 | 4/2023 |
| CA | 2915658 | C | 10/2023 |
| EP | 3299592 | B1 | 3/2020 |
| EP | 4174287 | A1 | 5/2023 |
| EP | 4047191 | B1 | 9/2024 |
| EP | 4563792 | A1 | 6/2025 |
| KR | 20210086234 | A | 7/2021 |
| KR | 102697340 | B1 | 8/2024 |
| KR | 20220093987 | B1 | 9/2025 |

* cited by examiner

EXHAUST CASE FOR AIRCRAFT ENGINE

TECHNICAL FIELD

The application relates generally to aircraft engines and, more particularly, to exhaust cases of such engines.

BACKGROUND

Exhaust ducts are disposed downstream of turbine sections and are configured for evacuating combustion gases that have been used to power the turbine sections. These combustion gases are hot and care should be taken to ensure that the exhaust ducts sustain these harsh conditions. Existing exhaust ducts are satisfactory to some extend, but improvements are always sought.

SUMMARY

In one aspect, there is provided an exhaust system for an aircraft engine of an aircraft having a direction of travel, comprising: a turbine exhaust duct (TED) having an annular inlet conduit extending around a central axis for directing combustion gases generally in an axial direction and outlet conduits communicating with the annular inlet conduit and extending generally radially outward relative to the annular inlet conduit; and an exhaust case enclosing the TED, the exhaust case extending from a forward end to a rearward end relative to the direction of travel, the exhaust case having openings, each of the outlet conduits received through a respective one of the openings; and reinforcing members secured to the exhaust cases between the forward end and the rearward end, the reinforcing members being located opposite circumferential sides of the openings and locally increasing a thickness of the exhaust case.

The exhaust system described above may include any of the following features, in any combinations.

In some embodiments, the reinforcing members are closer to the forward end than to the rearward end.

In some embodiments, the reinforcing members include a core, a peripheral base extending around the core, and a lip extending around the peripheral base, the peripheral base defining a contact surface being joined to the exhaust case.

In some embodiments, the core is offset from the peripheral base such that the core is free of contact with the exhaust case.

In some embodiments, a height of the lip taken in a direction being perpendicular to the peripheral base is non-uniform.

In some embodiments, the height is maximal at a location being both closes to one of the openings and to the forward end of the exhaust case.

In some embodiments, the reinforcing members follow contours of the openings.

In some embodiments, radial spacings are located between the reinforcing members and edges bounding the openings.

In some embodiments, the reinforcing members are disposed on one or both of a inner side and an outer side of the exhaust case.

In some embodiments, each of the reinforcing members includes a plurality of interconnected sides, a side of the interconnected sides extending parallel to the central axis.

In some embodiments, each of the reinforcing members includes a plurality of interconnected sides, a side of the interconnected sides extending parallel to a mounting flange at the forward end of the exhaust case.

In another aspect, there is provided a reverse-flow gas turbine engine of an aircraft having a direction of travel, comprising: an outer case assembly extending around a central axis and enclosing a core, the core including a compressor section, a combustor, and a turbine section, the turbine section being located forward of the combustor and of the compressor section relative to the direction of travel, the outer case assembly including an exhaust case defining openings, the exhaust case extending from a forward end to a rearward end being closer to the turbine section than the forward end; a turbine exhaust duct (TED) having an annular inlet conduit extending around the central axis for directing combustion gases generally in an axial direction and outlet conduits communicating with the annular inlet conduit and extending generally radially outward relative to the annular inlet conduit, the exhaust case having openings, each of the outlet conduits received through a respective one of the openings; and reinforcing members secured to the exhaust case, the reinforcing members being located proximate edges bounding the openings and locally increasing a thickness of the exhaust case.

The reverse-flow gas turbine engine described above may include any of the following features, in any combinations.

In some embodiments, the reinforcing members are closer to the forward end than to the rearward end.

In some embodiments, the reinforcing members include a core, a peripheral base extending around the core, and a lip extending around the peripheral base, the peripheral base defining a contact surface being joined to the exhaust case.

In some embodiments, the core is offset from the peripheral base such that the core is free of contact with the exhaust case.

In some embodiments, a height of the lip taken in a direction being perpendicular to the peripheral base is non-uniform, the height being maximal at a location being both closes to one of the openings and to the forward end of the exhaust case.

In some embodiments, the reinforcing members follow contours of the openings.

In some embodiments, radial spacings are located between the reinforcing members and edges bounding the openings.

In some embodiments, the reinforcing members are disposed on one or both of a inner side and an outer side of the exhaust case.

In some embodiments, each of the reinforcing members includes a plurality of interconnected sides, a side of the interconnected sides extending parallel to the central axis.

DESCRIPTION OF THE DRAWINGS

Reference is now made to the accompanying figures in which.

DETAILED DESCRIPTION

Figure 1:
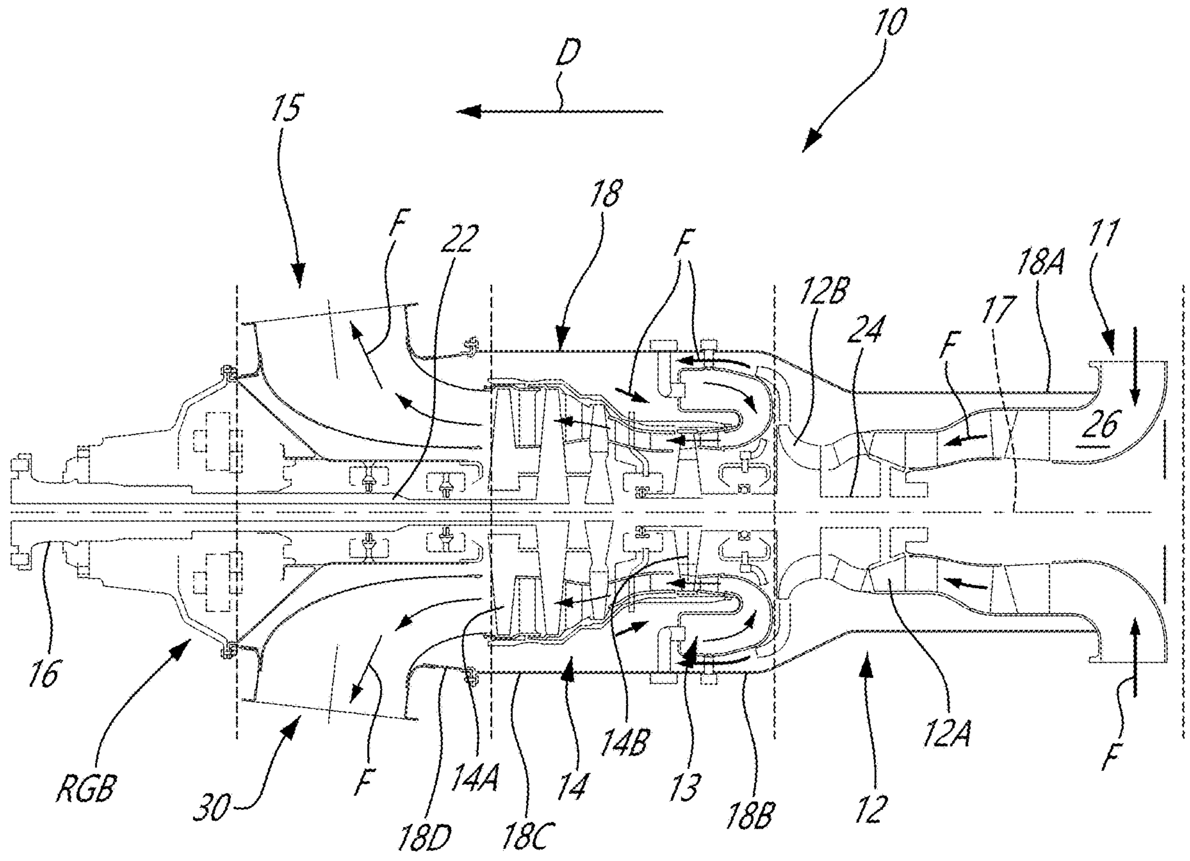
FIG. 1 is a schematic cross-sectional view of an aircraft engine depicted as a turboprop gas turbine engine.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like.

The gas turbine engine 10 has an outer case assembly 18 housing a central core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a gearbox RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

Figure 2:
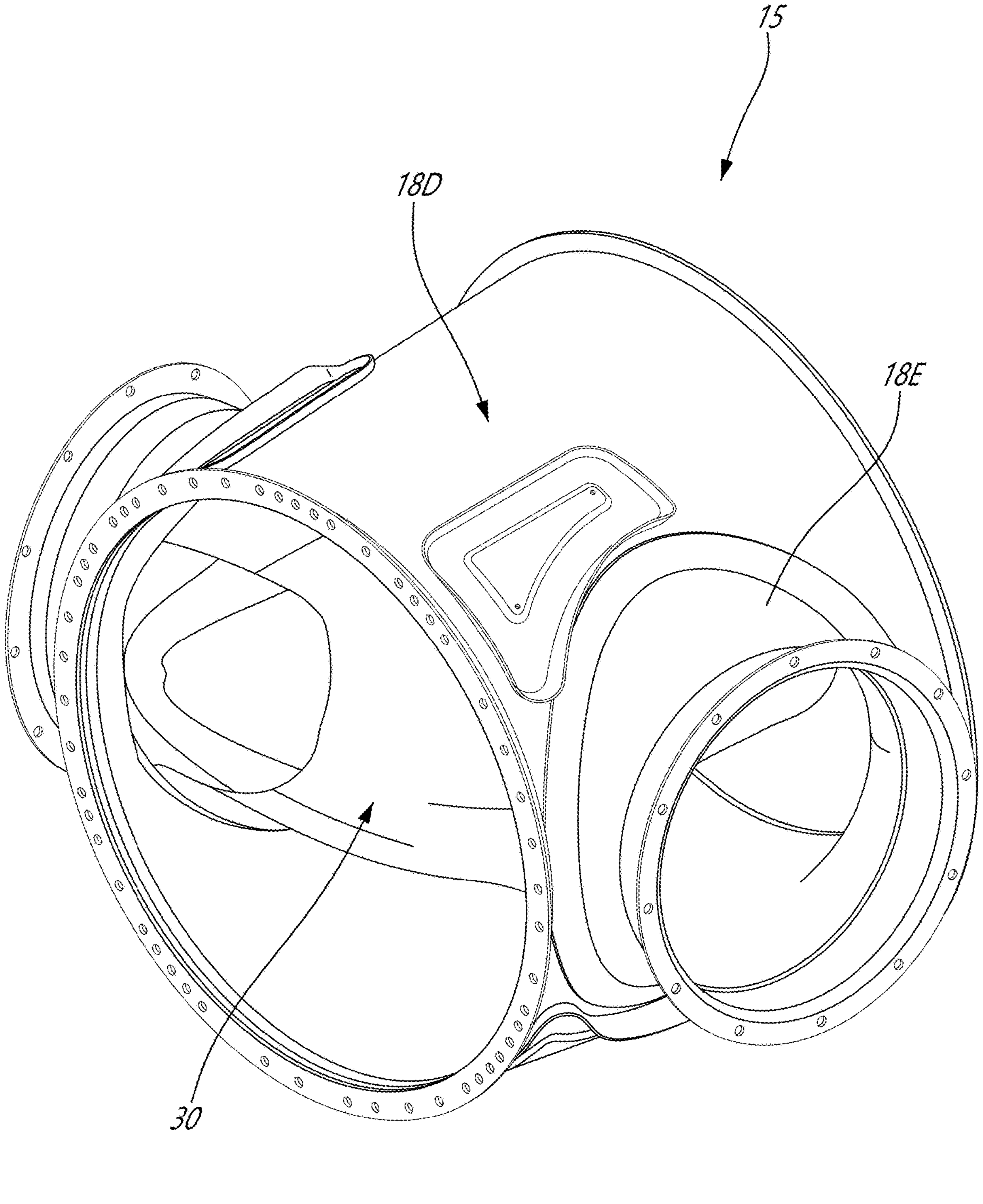
FIG. 2 is a three dimensional view of an exhaust system of the aircraft engine of FIG. 1.
Figure 3:
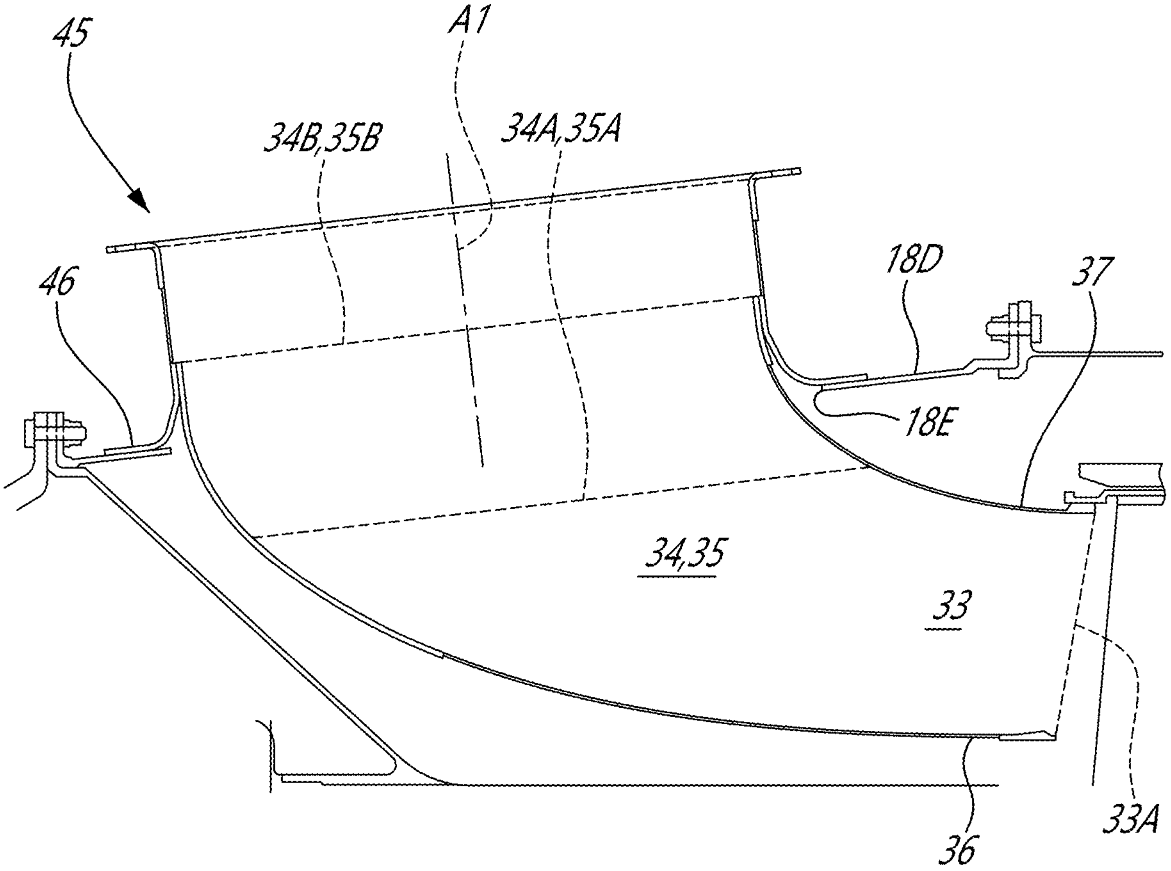
FIG. 3 is a cross-sectional view of the exhaust system of FIG. 2.

Referring to FIGS. 1-3, the exhaust system 15 of the gas turbine engine 10 comprises a turbine exhaust duct (TED) 30 secured to the exhaust case 18D. The exhaust case 18D extends circumferentially around the central axis 17 and defines openings 18E, two openings in this embodiment, sized for receiving portions of the turbine exhaust duct 30 that will be described below. The two openings 18E may be diametrically opposed to one another. More or less than two openings may be used in some embodiments.

Figure 4:
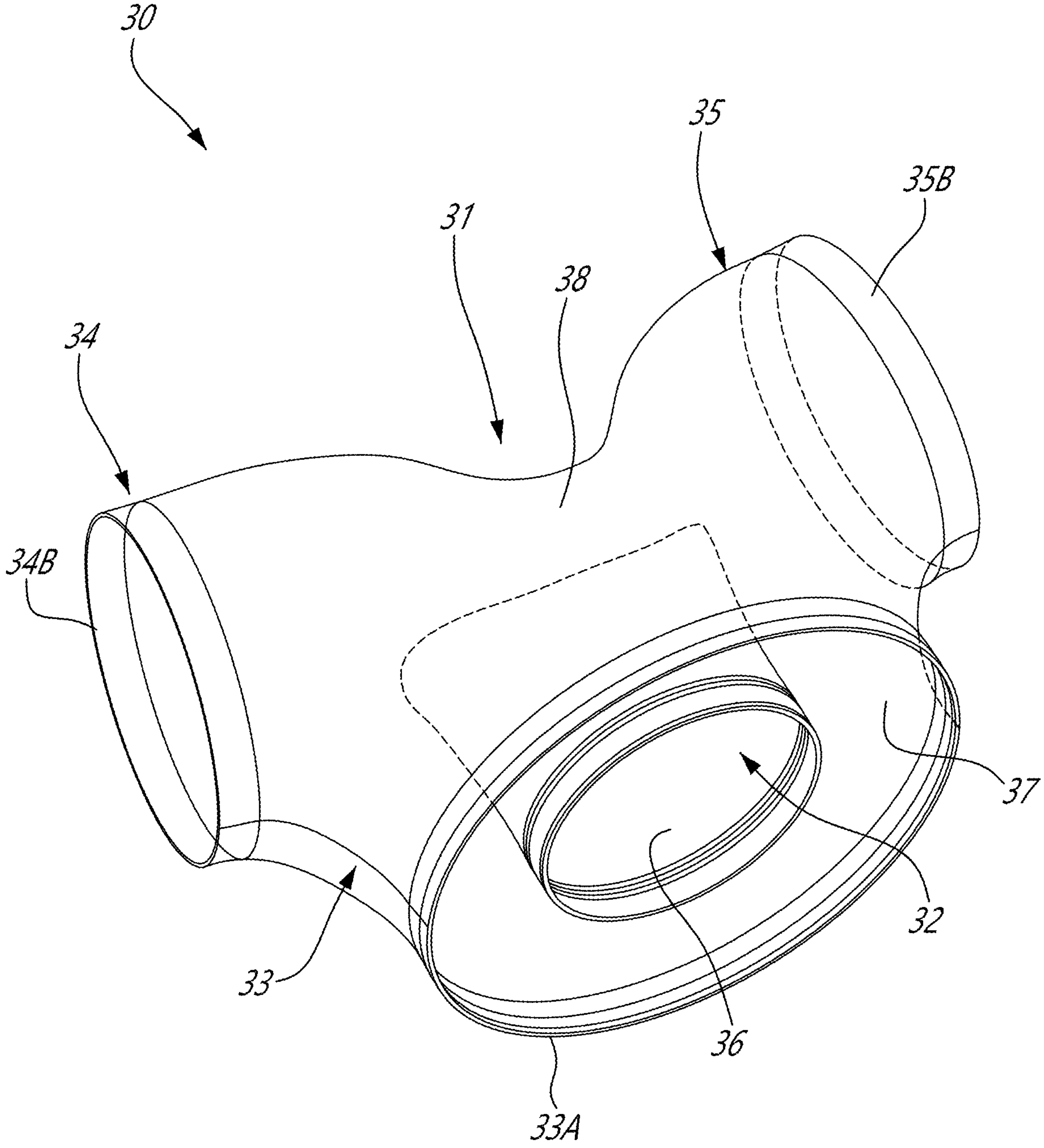
FIG. 4 is a three dimensional view of a turbine exhaust duct of the exhaust system of FIG. 3.
Figure 5:
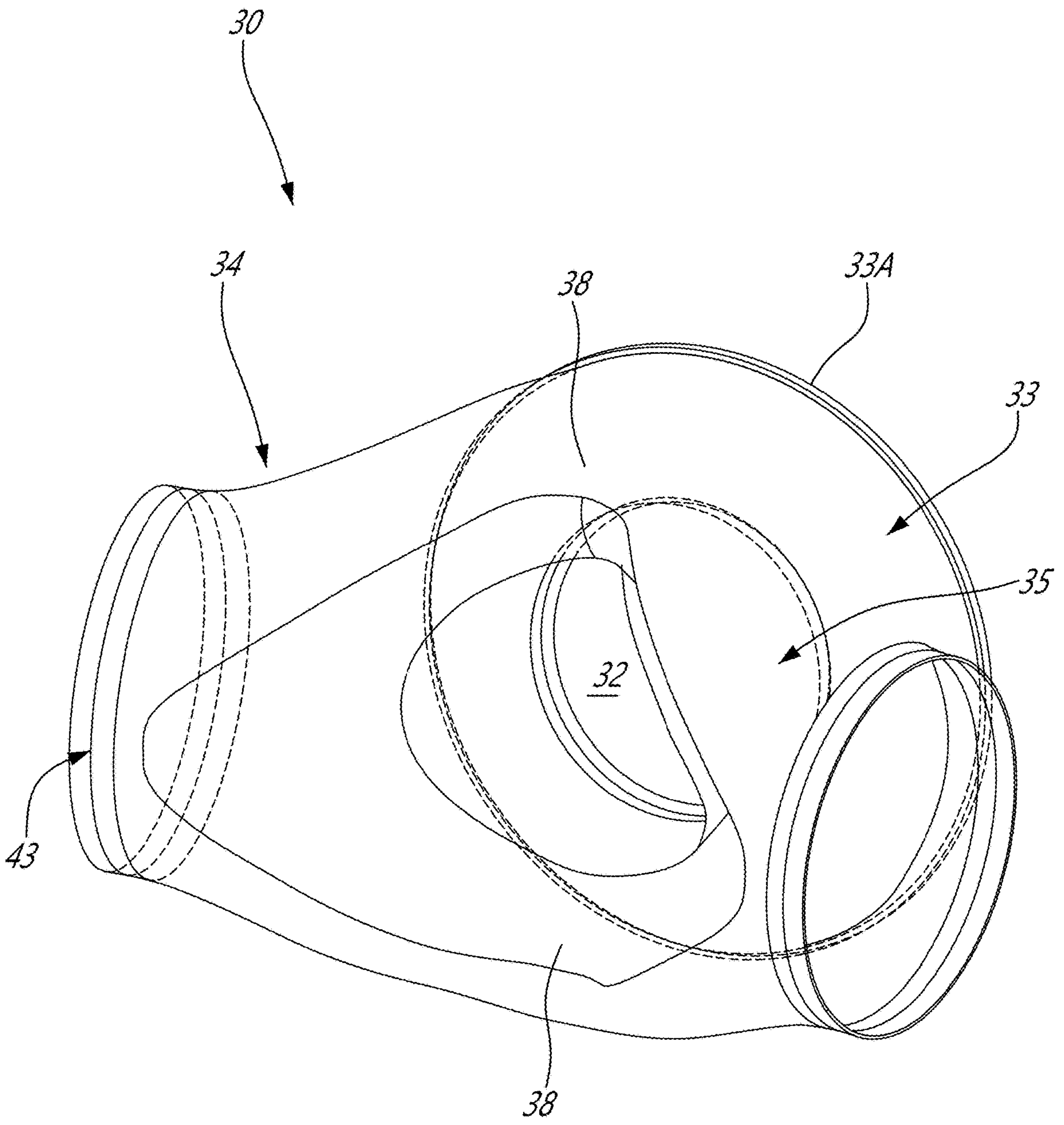
FIG. 5 is another three dimensional view of the turbine exhaust duct of FIG. 4.

Referring now to FIGS. 4-5, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e. the exhaust flow discharged from the exhaust duct is not axial, it is rather directed in a direction that diverges from the central axis 17). According to at least some embodiments, the TED 30 has a generally "Y-shaped" body including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit portion 34, 35 projects outwardly of the exhaust case 18D. As best shown in FIG. 3, each outlet conduit portion 34, 35 terminates into an exhaust port. The outlet conduits extend along respective axes that intersect the central axis 17. According to the illustrated embodiment, these axes has a main radial component and a secondary (i.e. smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g. oval).

Referring to FIGS. 3-5, the turbine exhaust duct 30, in this embodiment is a dual ports exhaust duct, and is formed by a generally Y-shaped body 31. The body 31 defines a fluid flow passage(s) about a central bore 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired the body 31 may include more than two outlet conduits. The inlet conduit 33 may be provided in the form of an annular inlet conduit 33 wherein the inlet conduit 33 is connected to and communicates with the outlet conduits 34, 35. The outlet conduits 34, 35 may not be perpendicularly positioned relative to the inlet conduit 33 (i.e. be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet centerlines which extend at an angle relative to each other. As shown in FIG. 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Still referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations.

As shown in FIGS. 4-5, the outer peripheral wall 37 and the inner peripheral wall 36 are connected to one another at outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

Referring back to FIG. 3, in the embodiment shown, exhaust rings 45 are mounted to the outlet ends 34B, 35B of the outlet conduits 34, 35. The exhaust rings 45 include peripheral flanges 46 that overlap the exhaust case 18D. The peripheral flanges 46 of the exhaust rings 45 may be welded to an outer side of the exhaust case 18D.

It has been observed by the inventors of the present disclosure that, during engine operation, loads are transmitted from the RGB to the exhaust system 15. The exhaust case 18D may thus be configured to support these loads. The exhaust case 18D may be made of sheet metal and may have a cylindrical or frustoconical shape to meet rigidity requirements. However, the reverse flow turbine exhaust duct 30 has a dual port gas path that exit through the exhaust case 18D. The presence of two openings 18E on either side of the exhaust case 18D may impair rigidity. The engine operating load induces a certain amount of deformation in the structure connecting the rear flange to the front flange which couples to the gearbox. It has been further observed that most of the deformation occur at specific locations around the openings 18E defined through the exhaust case 18D.

These deformations may at least partially be mitigated by the use of stiffeners or reinforcing members that overlap some areas around the openings 18E. Theses stiffeners may be seam welded or braze against the exhaust case 18D at specific locations as described below. Two stiffeners per apertures on one or both side of the exhaust case 18D may be used. This design may improve the stiffness at a specific location. With this design, it is possible to maintain the weight of the part to a minimum by stiffening only the area of weakness rather than increasing the thickness of the whole exhaust case 18D.

Figure 6:
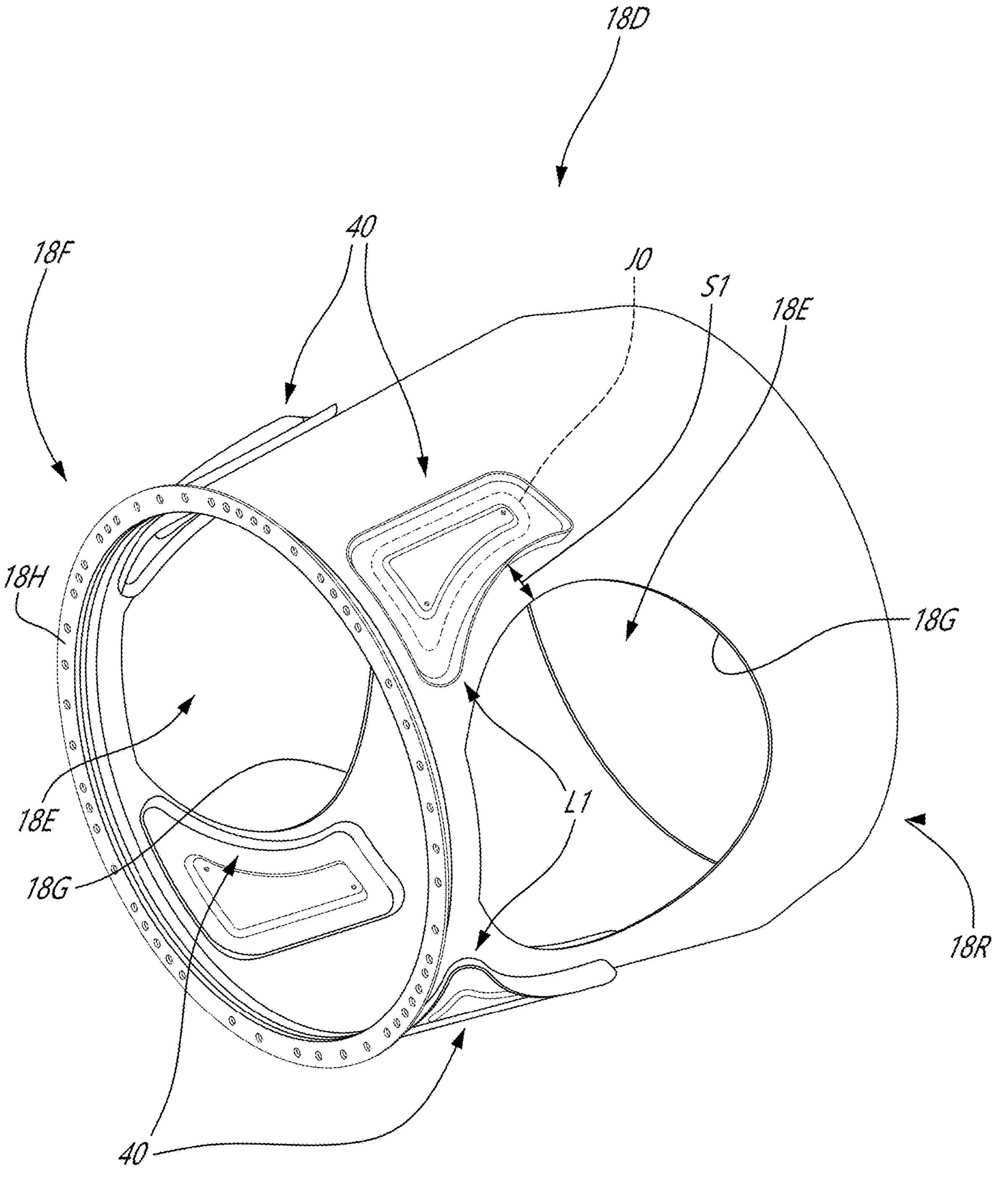
FIG. 6 is a three dimensional view of an exhaust case of the exhaust system of FIG. 3.

Referring to FIG. 6, the exhaust case 18D is shown with the turbine exhaust duct 30 removed for clarity.

In the embodiment shown, the exhaust case 18D extends from a forward end 18F to a rearward end 18R relative to the direction of travel D. The rearward end 18R is closer to the turbine section 14 than the forward end 18F. The openings 18E are bounded by peripheral edges 18G. As discussed above, the stiffness of the exhaust case 18D may be impaired by the openings 18E extending therethrough. To at least partially alleviate this drawback, reinforcing members 40 are secured to the exhaust case 18D to locally increase a thickness of the exhaust case 18D. The reinforcing members 40 may be brazed, welded to the exhaust case 18D. Any suitable fastening means may alternatively be used (e.g., fasteners).

The exhaust case 18D has a frustoconical shape and the reinforcing members 40 are located proximate a location where the diameter of the exhaust case 18D is the smallest. These reinforcing members 40 may extend substantially a full length between opposite flanges of the exhaust case 18D. The reinforcing members 40 may extend circumferentially half a circumferential distance between the openings 18E defined through the exhaust case 18D. In other words, two reinforcing members 40 may be welded or brazed together at their straight sides 40D. The reinforcing members 40 may contribute in rigidifying a portion of the exhaust case 18D that may be more prone to deformation due to its small diameter and due to the presence of the openings 18E. The thickness of the reinforcing members 40 may be the same as that of the exhaust case 18D.

In the embodiment shown, the reinforcing members 40 are located on opposite circumferential sides of the openings 18E. In other words, each of the openings 18E has two sides being circumferentially offset from one another and located on opposite sides of a symmetry plane containing the central axis 17 and intersecting a center of the openings 18E. Moreover, a major portion of the reinforcing members 40 are located forward of a plane being perpendicular to the central axis 17 and intersecting the center of the openings 18E. In other words, the reinforcing members 40 may be located closer to the forward end 18F than the rearward end 18R of the exhaust case 18D. In the context of the present disclosure, the expression "major portion" implies 50% or more. In some embodiments, the reinforcing members 40 may be located entirely between the forward end 18F of the exhaust case 18D and the plane being perpendicular to the central axis 17. The reinforcing members 40 are shown as being secured to both of an inner side and an outer side of the exhaust case 18D. The inner side faces the central axis 17 whereas the outer side faces away from the central axis 17. The reinforcing members 40 may be secured solely to the outer side or solely to the inner side in some embodiments.

Figure 7:
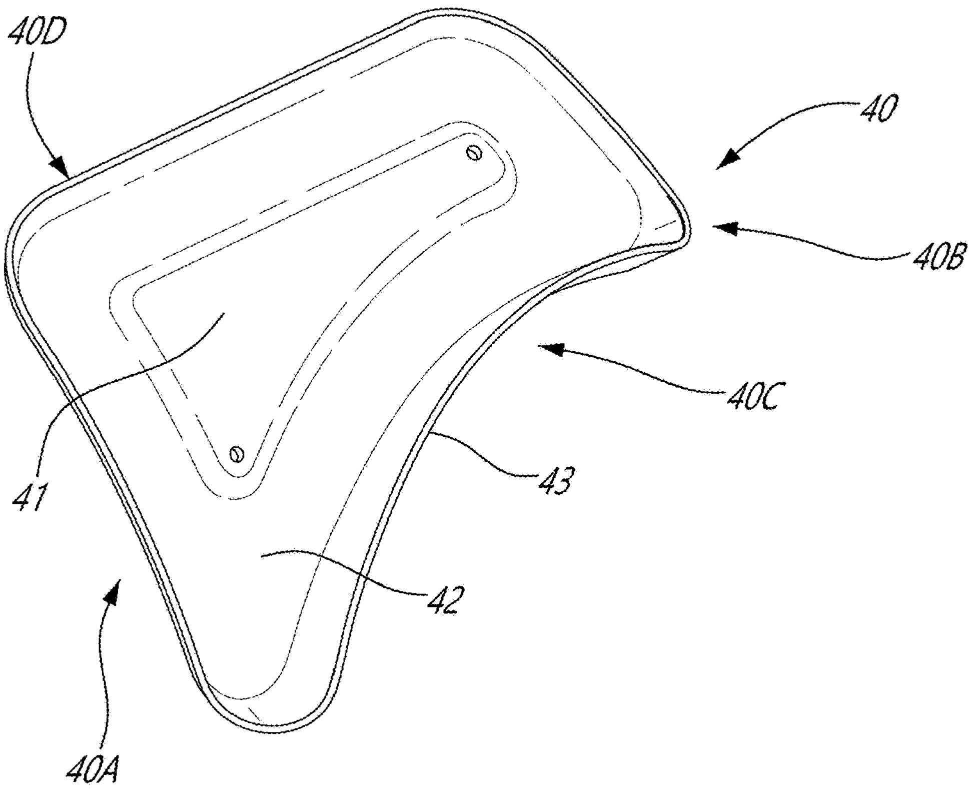
FIG. 7 is a top three dimensional view of a reinforcing member for the exhaust system of FIG. 6.
Figure 8:
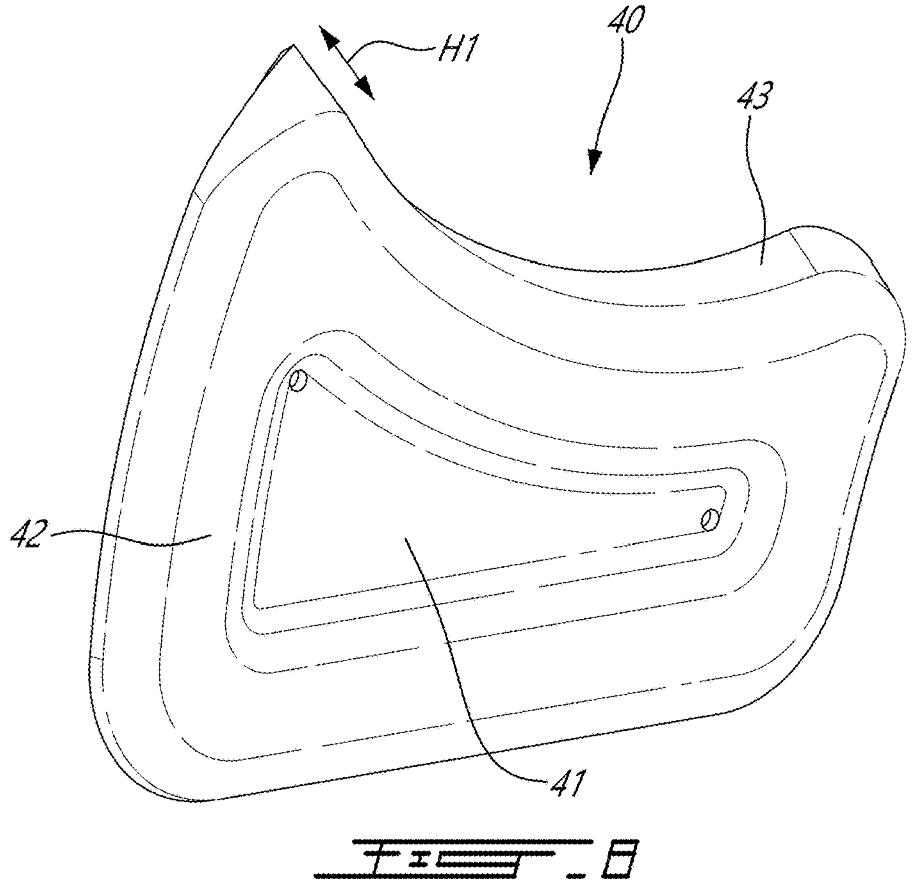
FIG. 8 is a bottom three dimensional view of the reinforcing member of FIG. 7.

Referring to FIGS. 7-8, the reinforcing members 40 are described herein below using the singular form, but the description may apply to each of the reinforcing members 40.

The reinforcing member 40 includes interconnected sides. Namely, the interconnected sides include a forward side 40A and rearward side 40B. The forward side 40A is closer to the forward end 18F of the exhaust case 18D than the rearward side 40B. The interconnected sides of the reinforcing member 40 further include an opening-contouring side 40C and a straight side 40D being opposite the opening-contouring side 40C. As illustrated, the opening-contouring side 40C has a curved shape designed to follow the peripheral edge 18G (FIG. 6) of a corresponding one of the openings 18E. In other words, the opening-contouring side 40C allows the reinforcing members 40 to follow contours of the openings 18E. In this embodiment, spacings S1 are located between the reinforcing members 40 and the edges 18G of the openings 18E, more specifically between the opening-contouring sides 40C and the edges 18G of the openings 18E. A dimension of these radial spacings S1, relative to central axes of the outlet conduits, is selected to accommodate the peripheral flanges 46 of the exhaust rings 45 that are used for securing the outlet conduits 34, 35 of the turbine exhaust duct 30 to the exhaust case 18D.

The straight side 40D is straight and may be parallel to the central axis 17 once secured to the exhaust case 18D. The forward side 40A of the reinforcing member 40 may extend parallel to a mounting flange 18H located at the forward end 18F of the exhaust case 18D. The reinforcing member 40 may be smaller at the rearward side 40B than at the forward side 40A.

In the embodiment shown, the reinforcing member 40 has a core 41, a peripheral base 42 extending around the core 41, and a lip 43 extending around the peripheral base 42. The reinforcing member 40 is secured to the exhaust case 18D via the peripheral base 42, which defines a contact surface with the exhaust case. A weld joint JO (FIG. 6) may be disposed between the peripheral base 42 and the exhaust case 18D.

As illustrated in FIG. 8, the core 41 is offset from the peripheral base 42. In other words, the core 41 may be seen as a bump (or dimple) and is configured to increase a stiffness of the reinforcing member 40. Apertures may be defined through the core 41 to allow air to escape during a welding/brazing process of the reinforming member 40 to the exhaust case 18D. The core 41 is thus free of contact with the exhaust case 18D.

In some embodiments, a height H1 of the lip 43 taken in a direction being perpendicular to the peripheral base 42 is non-uniform. That is, the height H1 may vary along a periphery of the peripheral base 42. In this embodiment, the height H1 may be maximal at a location L1, which is closest to the openings 18E and the forward end 18F of the exhaust case 18D. The height H1 of the lip 43 may be greater on the opening-contouring side 40C of the reinforcing member 40 than on the other sides thereof.

In view of the foregoing, it may be appreciated that at least in some embodiments, the reinforcing members 40 may increase a stiffness of the exhaust system 15 while minimizing weight increase to allow the exhaust system 15 to withstand the loads and hot combustion gases it is subjected to.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust system for an aircraft engine of an aircraft having a direction of travel, comprising:

- a turbine exhaust duct (TED) having an annular inlet conduit extending around a central axis for directing combustion gases generally in an axial direction and outlet conduits communicating with the annular inlet conduit and extending generally radially outward relative to the annular inlet conduit;
- an exhaust case enclosing the TED, the exhaust case extending from a forward end to a rearward end relative to the direction of travel, the exhaust case having openings, each of the outlet conduits received through a respective one of the openings, the openings including at least a first opening and a second opening; and
- reinforcing members secured to the exhaust case between the forward end and the rearward end, the reinforcing members locally increasing a thickness of the exhaust case, the reinforcing members including:
  - two or more first reinforcing members being separated from one another and located at opposite circumferential sides of the first opening, and
  - two or more second reinforcing members being separated from one another and located at opposite circumferential sides of the second opening.

2. The exhaust system of claim 1, wherein the reinforcing members are closer to the forward end than to the rearward end.

3. The exhaust system of claim 1, wherein the reinforcing members include a core, a peripheral base extending around the core, and a lip extending around the peripheral base, the peripheral base defining a contact surface being joined to the exhaust case.

4. The exhaust system of claim 3, wherein the core is offset from the peripheral base such that the core is free of contact with the exhaust case.

5. The exhaust system of claim 3, wherein a height of the lip taken in a direction being perpendicular to the peripheral base is non-uniform.

6. The exhaust system of claim 5, wherein the height is maximal at a location being both closes to one of the openings and to the forward end of the exhaust case.

7. The exhaust system of claim 1, wherein the reinforcing members follow contours of the openings.

8. The exhaust system of claim 7, wherein radial spacings are located between the reinforcing members and edges bounding the openings.

9. The exhaust system of claim 1, wherein the reinforcing members are disposed on one or both of a inner side and an outer side of the exhaust case.

10. The exhaust system of claim 1, wherein each of the reinforcing members includes a plurality of interconnected sides, a side of the interconnected sides extending parallel to the central axis.

11. The exhaust system of claim 1, wherein each of the reinforcing members includes a plurality of interconnected sides, a side of the interconnected sides extending parallel to a mounting flange at the forward end of the exhaust case.

12. A reverse-flow gas turbine engine of an aircraft having a direction of travel, comprising:

- an outer case assembly extending around a central axis and enclosing a core, the core including a compressor section, a combustor, and a turbine section, the turbine section being located forward of the combustor and of the compressor section relative to the direction of travel, the outer case assembly including an exhaust case defining openings, the exhaust case extending from a forward end to a rearward end being closer to the turbine section than the forward end;
- a turbine exhaust duct (TED) having an annular inlet conduit extending around the central axis for directing combustion gases generally in an axial direction and outlet conduits communicating with the annular inlet conduit and extending generally radially outward relative to the annular inlet conduit, the exhaust case having openings, each of the outlet conduits received through a respective one of the openings;
- peripheral flanges mounted to the exhaust case and each surrounding a respective one of the openings, the peripheral flanges bridging gaps between peripheries of the openings and the outlet conduits; and
- reinforcing members secured to the exhaust case, reinforcing members being located proximate edges bounding the openings and locally increasing a thickness of the exhaust case, the reinforcing members located radially outwardly of the peripheral flanges relative to conduit axes of the outlet conduits.

13. The reverse-flow gas turbine engine of claim 12, wherein the means include reinforcing members are closer to the forward end than to the rearward end.

14. The reverse-flow gas turbine engine of claim 12, wherein the reinforcing members including a core, a peripheral base extending around the core, and a lip extending around the peripheral base, the peripheral base defining a contact surface being joined to the exhaust case.

15. The reverse-flow gas turbine engine of claim 14, wherein the core is offset from the peripheral base such that the core is free of contact with the exhaust case.

16. The reverse-flow gas turbine engine of claim 14, wherein a height of the lip taken in a direction being perpendicular to the peripheral base is non-uniform, the height being maximal at a location being both closes to one of the openings and to the forward end of the exhaust case.

17. The reverse-flow gas turbine engine of claim 12, wherein the reinforcing members follow contours of the openings.

18. The reverse-flow gas turbine engine of claim 17, wherein radial spacings are located between the reinforcing members and edges bounding the openings.

19. The reverse-flow gas turbine engine of claim 12, wherein the reinforcing members are disposed on one or both of an inner side and an outer side of the exhaust case.

20. The reverse-flow gas turbine engine of claim 12, wherein each of the reinforcing members includes a plurality of interconnected sides, a side of the interconnected sides extending parallel to the central axis.

* * * * *